April 9, 1968  J. H. AUER, JR  3,377,616
VEHICLE IDENTIFICATION SYSTEM
Filed April 27, 1964  6 Sheets-Sheet 1

INVENTOR.
J. H. AUER. JR
BY
HIS ATTORNEY

April 9, 1968   J. H. AUER, JR   3,377,616
VEHICLE IDENTIFICATION SYSTEM
Filed April 27, 1964   6 Sheets-Sheet 3

INVENTOR.
J. H. AUER JR.
BY
HIS ATTORNEY

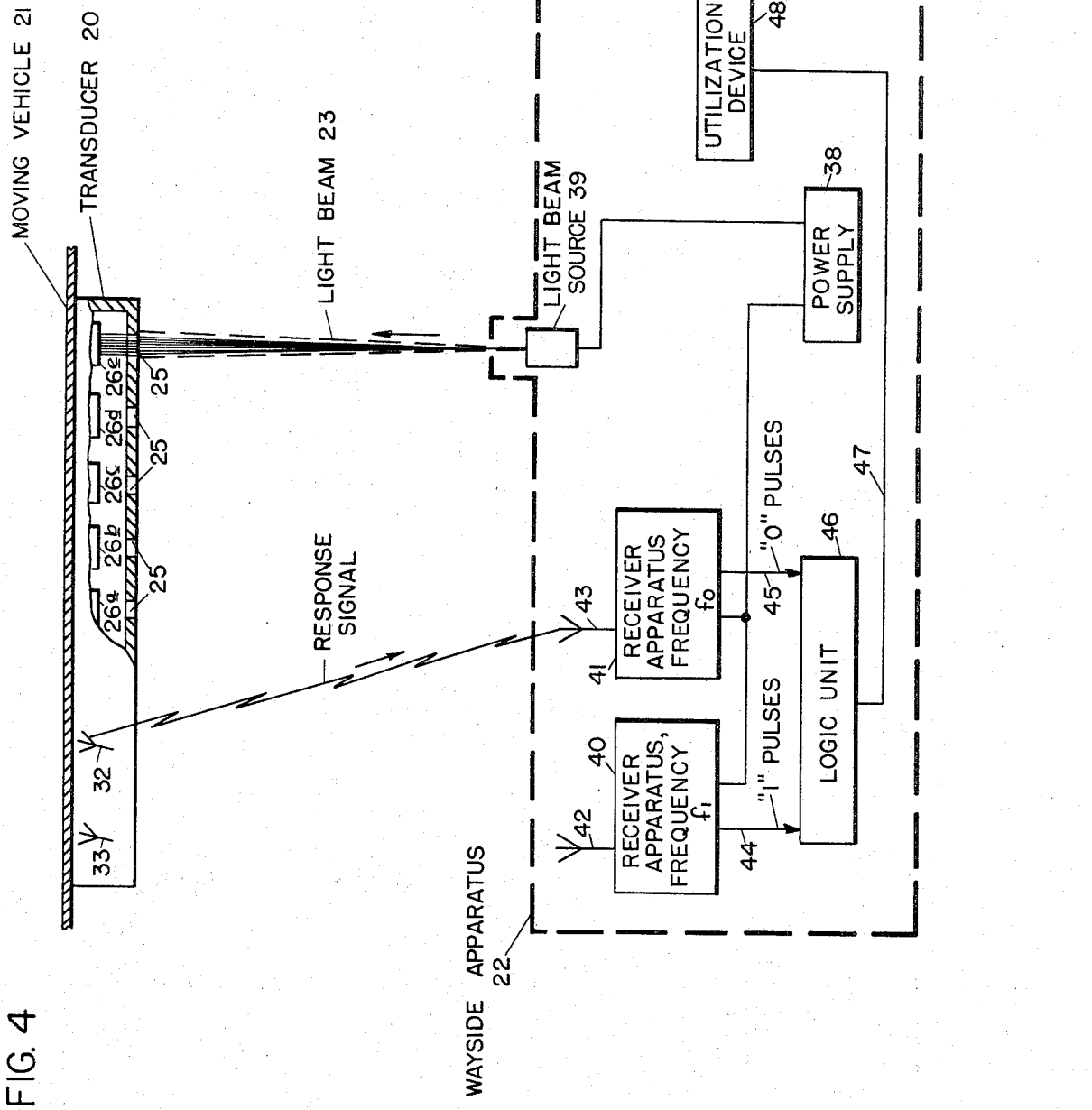

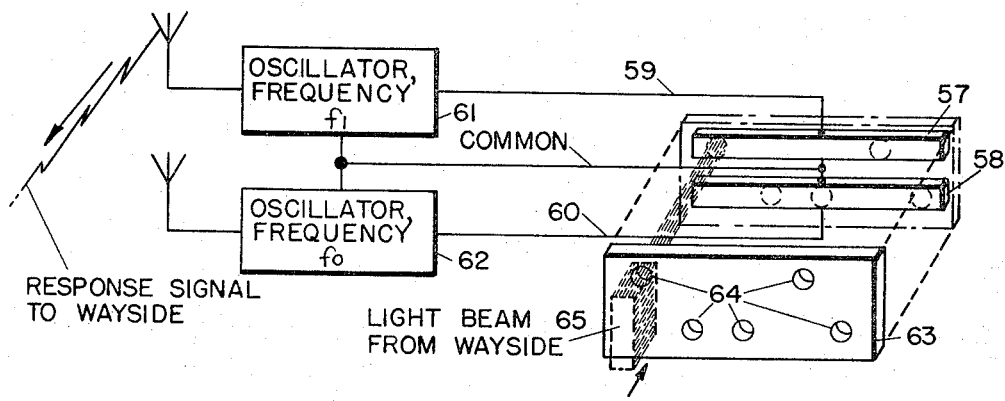

April 9, 1968 J. H. AUER, JR 3,377,616
VEHICLE IDENTIFICATION SYSTEM
Filed April 27, 1964 6 Sheets-Sheet 6

INVENTOR.
J.H. AUER JR.
BY
HIS ATTORNEY

United States Patent Office 3,377,616
Patented Apr. 9, 1968

3,377,616
VEHICLE IDENTIFICATION SYSTEM
John H. Auer, Jr., Fairport, N.Y., assignor to General Signal Corporation, Rochester, N.Y., a corporation of New York
Filed Apr. 27, 1964, Ser. No. 362,739
40 Claims. (Cl. 340—23)

ABSTRACT OF THE DISCLOSURE

This application discloses a car identification system for transmitting information between the passing cars and wayside apparatus. An energy source, in the form of light projecting apparatus, directs its beam towards the passing cars. A group of solar cells is located on each car in a longitudinal series. A mask fits over the cells with an aperture adjacent to each cell so that the sharp beam of light from the wayside successively activates each cell of the series to produce a series of pulses as the car moves past the wayside location. These pulses are selectively applied to one or the other of two radio frequency transmitters of distinctive character. Thus, a binary radio pulsed type code is transmitted from each passing car. The wayside equipment receives and decodes these binary codes, and thus identifies the successively passing cars.

Summary of invention

The present invention generally relates to systems and apparatus for communicating information between spaced objects or locations, and particularly between a predetermined wayside location and a moving object or vehicle.

In communication systems, it is often desirable to render the transmitting apparatus at one location effective by a command signal sent from the other location, and furthermore, in order to conserve energy and thereby minimize the expense of the system apparatus, it is also often desirable that such transmitting apparatus be powered by energy extracted from the command signal. In this way, only one source of energy is required within the communication system.

Although the system and apparatus of the present invention is adaptable for conveying selected information between substantially any two objects, whether stationary or moving relative to one another, it has particular utility for the purpose of conveying information to or from moving objects or vehicles as they pass adjacent a fixed wayside location. Under such circumstances, for example, a transducer device is provided on each of the vehicles including suitable transmitting apparatus and also means for extracting energy from a wayside energy source as the vehicle passes the wayside location with which to power or actuate the transmitting apparatus within the transducer to generate a response signal coded in some predetermined manner in accordance with the particular information to be conveyed by each vehicle to suitable receiving apparatus at the wayside location.

It is more specifically proposed in accordance with the present invention to provide a vehicle carried transducer device including electrical signal generating circuitry and photoelectric means (for example, one or more photovoltaic devices such as solar cells or the like). The signal generating circuitry is operably connected to the photoelectric means in predetermined manner such that, when the photoelectric means are exposed to an interrogating or command light beam directed onto the transducer from the wayside location, the photic energy from the light beam is converted into electrical energy capable of powering or operating the electrical signal generating circuitry of the transducer to produce a response signal output coded in accordance with the particular information to be conveyed from the vehicle to the wayside location. On the wayside is suitable apparatus for receiving and decoding the response signal from the transducer.

In view of the above discussion, a general object of the present invention is to provide a system and apparatus for conveying information between spaced locations.

A further object of this invention is to utilize photoelectric means within a communication system for converting light or photic energy into electrical energy which, in turn, is capable of operating or powering electrical signal generating circuitry to produce a signal output therefrom which is coded in accordance with the particular information to be communicated within the system.

A more specific object of the present invention is to provide a transducer device adapted to be carried on a vehicle and comprising electrical signal generating circuitry and photoelectric means capable of powering the signal generating circuitry from light or photic energy received from a wayside light beam to which the photoelectric means are exposed upon the vehicle's passing a predetermined wayside location, to thereby cause the circuitry to generate an output signal coded in accordance with predetermined information to be conveyed between the vehicle upon which the transducer is mounted and suitable signal receiver apparatus on the wayside.

One possible embodiment of the communication system and apparatus provided by the present invention is in the form of a vehicle identification system and apparatus whereby the identity of each vehicle, such as a railway car, may be automatically detected as it passes a predetermined wayside interrogating location, such as, for example, at the approach to a railway classification yard or wherever it is desirable to detect the identity of passing railway cars.

The need for a simple, inexpensive, yet reliable railway car identification system, such as is provided by the present invention is readily apparent from the many articles pointing out the tremendous savings that might be realized by the various operating railroads from a system that automatically detects the identity of railway cars as they pass a predetermined wayside location to thereby obviate the necessity of having a person visually inspect each railway car as it passes, as has been the practice heretofore.

However, it should be clearly understood at this time that the utility of the present invention is not in any way limited to vehicle identification, but, is suitable for transferring or communicating substantially any type or character of predetermined information between a moving vehicle and a fixed wayside location.

In the automatic vehicle identification system embodying the present invention, it is generally proposed to mount a suitable transducer device on each vehicle or railway car to be identified; which transducer includes electrical signal generating circuitry rendered effective, when photoelectric means within the transducer device are exposed to a wayside light beam, to produce a signal output which is radiated to suitable wayside receiving apparatus and which is distinctively coded in accordance with the particular car number or other identifying information regarding the passing vehicle.

In the illustrated embodiment of the invention to be discussed hereinafter, a pair of electrical signal oscillator circuits (each of a different frequency) are mounted within the vehicle carried transducer along with suitable photoelectric devices arranged with the transducer and connected to the oscillator circuitry in such manner that, as the particular vehicle passes the interrogating location, the transducer is scanned by an interrogating light beam which impinges upon the photoelectric devices so that the photic energy of the light beam is converted into a series of electrical operating energy pulses capable of selectively actuating the pair of signal oscillators in a coded sequence preselected in accordance with the particular information (that vehicle's identity) to be communicated to the wayside. Thus, as a vehicle passes the interrogating location, its transducer transmits or radiates a series of pulses to suitable wayside receiving apparatus; which signal pulses are of one frequency or the other and in predetermined sequence to form a coded binary representation of the identity information being conveyed to the wayside.

The photoelectric means may be any suitable type such as solar cells or the like which can then be arranged in various manners within the transducer device to selectively actuate or power the oscillator circuits sequentially in accordance with the identity of the particular car upon which that transducer is mounted. Thus, a plurality of solar cells could be mounted behind a suitable plate or card made of opaque material but preformed in a coded manner to have a plurality of light holes therein through which the wayside light beam is sequentially and selectively directed to one or the other of the solar cells.

In the illustrated embodiment of the present invention, since the information is conveyed between the vehicle and the wayside location in the form of a sequential series of signal pulses, the receiving apparatus at the interrogating location may preferably be provided with circuitry effective to permit proper readout or interpretation of the conveyed information irrespective of the direction of travel of the passing vehicle; i.e. the wayside apparatus is circuited so that it can, for example, properly read a car number for both directions of car travel past the wayside location.

In view of the above discussion, another object of the present invention is to provide a system and apparatus effective to permit the automatic detection of the identity of vehicles passing a predetermined wayside location.

Another specific object of the present invention is to provide a transducer device adapted to be mounted on a vehicle and including a pair of electrical signal oscillators and photoelectric means effective when scanned by a wayside light beam to convert the photic energy of the light beam into electrical energy for selectively pulsing the oscillators in sequence to transmit to wayside receiver apparatus a predetermined series of output pulses as a coded binary signal indicating the identity of the passing vehicle.

A further object of the present invention is to provide a system of the type described wherein the information, such as a number distinctly identifying a vehicle, is sequentially conveyed to suitable receiving apparatus effective to permit proper readout or interpretation of the information irrespective of the direction of travel of the vehicle as it passes the interrogating or receiving location.

Other objects, purposes and characteristic features of the present invention will in part be pointed out as the description of the invention progresses and in part obvious from the accompanying drawings in which:

FIG. 4 illustrates in more detail the apparatus provided at a typical wayside receiving location in accordance with this same embodiment of the present invention, as shown in FIG. 2;

FIG. 7 illustrates a modified form of the transducer device of FIG. 2;

Figure 9:
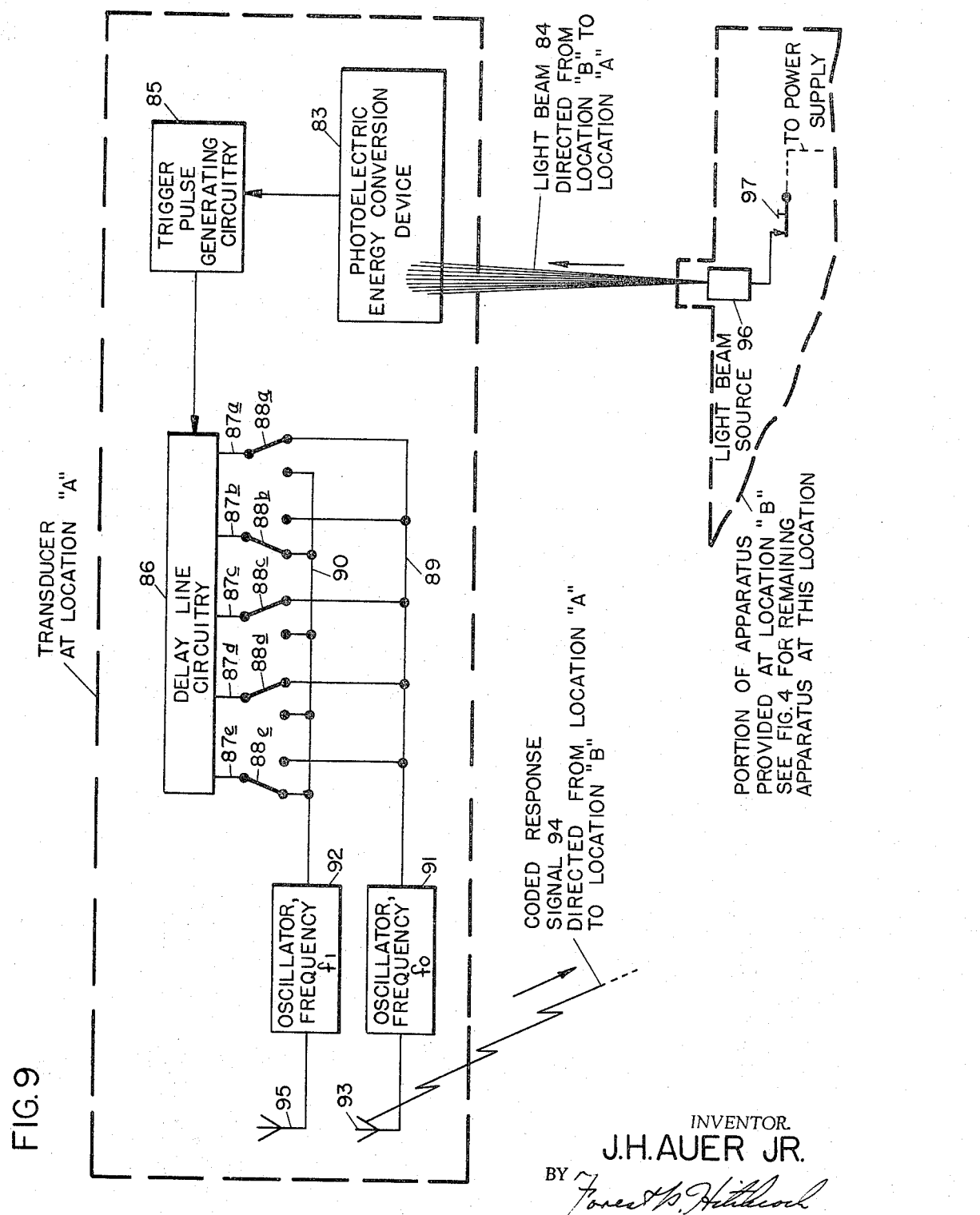

FIG. 8 illustrates another modification of the communication system embodying the present invention and including different forms of vehicle carried transducer device and wayside apparatus; and FIG. 9 illustrates a still further form of transducer device constructed in accordance with the present invention for communicating predetermined information upon receipt of an interrogating or command light beam, but, without requiring relative movement of the transducer with respect to the light beam.

Figure 1:
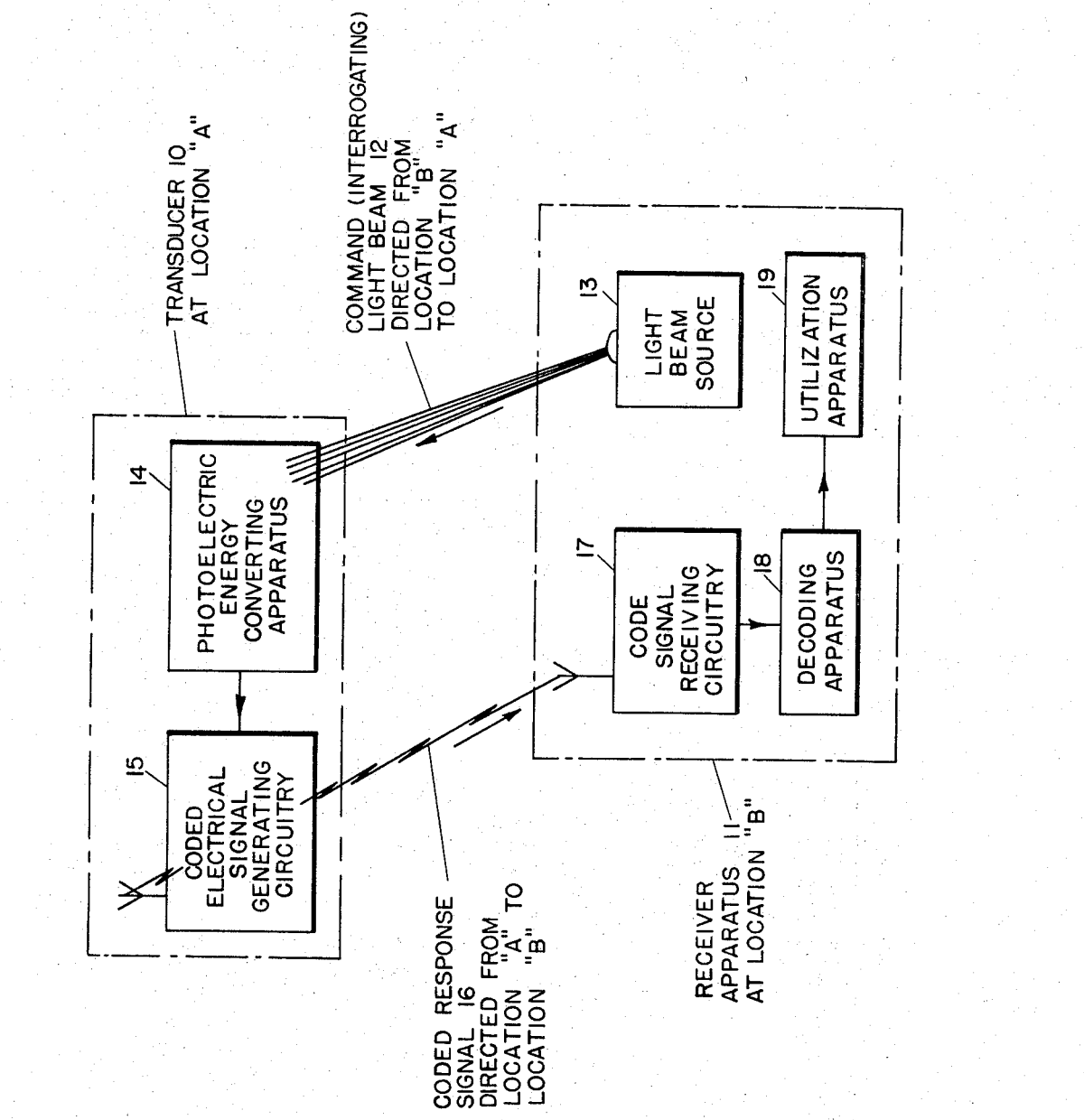
FIG. 1 is a block diagram illustrating the principles of the communication system and apparatus provided by the present invention.

Referring now to the block diagram of FIG. 1, the communication system provided by the present invention basically comprises a transducer device 10 situated at one location designated hereinafter as location "A" for the purpose of communicating predetermined information to suitable receiver apparatus 11 spaced therefrom at some other location "B," in response to a command light beam signal directed towards location "A" from location "B." More particularly, in accordance with the present invention, light beam 12 is directed by a suitable source 13 (at location "B") towards location "A" so that it impinges upon photoelectric means 14 contained within the transducer 10. The photoelectric means 14 function in a well-known manner to convert the photic energy of the command or interrogating light beam 12 into electrical energy which, in turn, is supplied to and operates or powers suitable electrical signal generating circuitry 15 to provide an output signal 16 (for transmission back to the location "B") coded in accordance with the particular information to be communicated from location "A" to location "B." The apparatus at location "B" then includes signal receiving circuitry 17 for receiving the coded response signal 16; decoding apparatus 18 for decoding the information contained in the received signal 16; and, suitable utilization apparatus 19 such as telemetering equipment or the like which in some way makes use of the received signal.

The above-mentioned coding of the generating circuitry 15 in accordance with the particular information to be conveyed to location "B" can be accomplished in any of a number of well-known ways. For example, the circuitry 15 might include a plurality of oscillators effective when supplied with electrical operating energy from the photoelectric converter device 14 to simultaneously generate a combination or group of frequencies distinctive of the information to be communicated; or as an alternative, the circuitry 15 might include a pair of electrical oscillator circuits effective when supplied with the converted electrical energy to generate sequential pulses of two distinct frequencies as a coded binary representation of the communicated information. Such sequential generation can be accomplished either by utilizing a single photoelectric device effective when receiving photic energy from the command or interrogating light beam to cause the cycling of programmed pulsing apparatus which selectively renders the oscillator pair effective to generate their respective frequencies in the desired coded time sequence (as illustrated in FIG. 9), or else, a plurality of spaced photoelectric devices could be arranged effectively in a row within the transducer (see FIGS. 2 and 3 for example) and be selectively connected to power the oscillator pair according to the predetermined coded time sequence, as the photoelectric devices are sequentially scanned by the light beam.

As pointed out previously, but without in any way attempting to limit the spirit or scope of the present invention, the information communication system and apparatus provided by the present invention has particular utility for communicating with vehicles (such as railway cars, for example) as they pass a predetermined wayside location. This mode of operation is more specifically illustrated in the remaining drawings, FIGS. 2 through 8.

Figure 2:
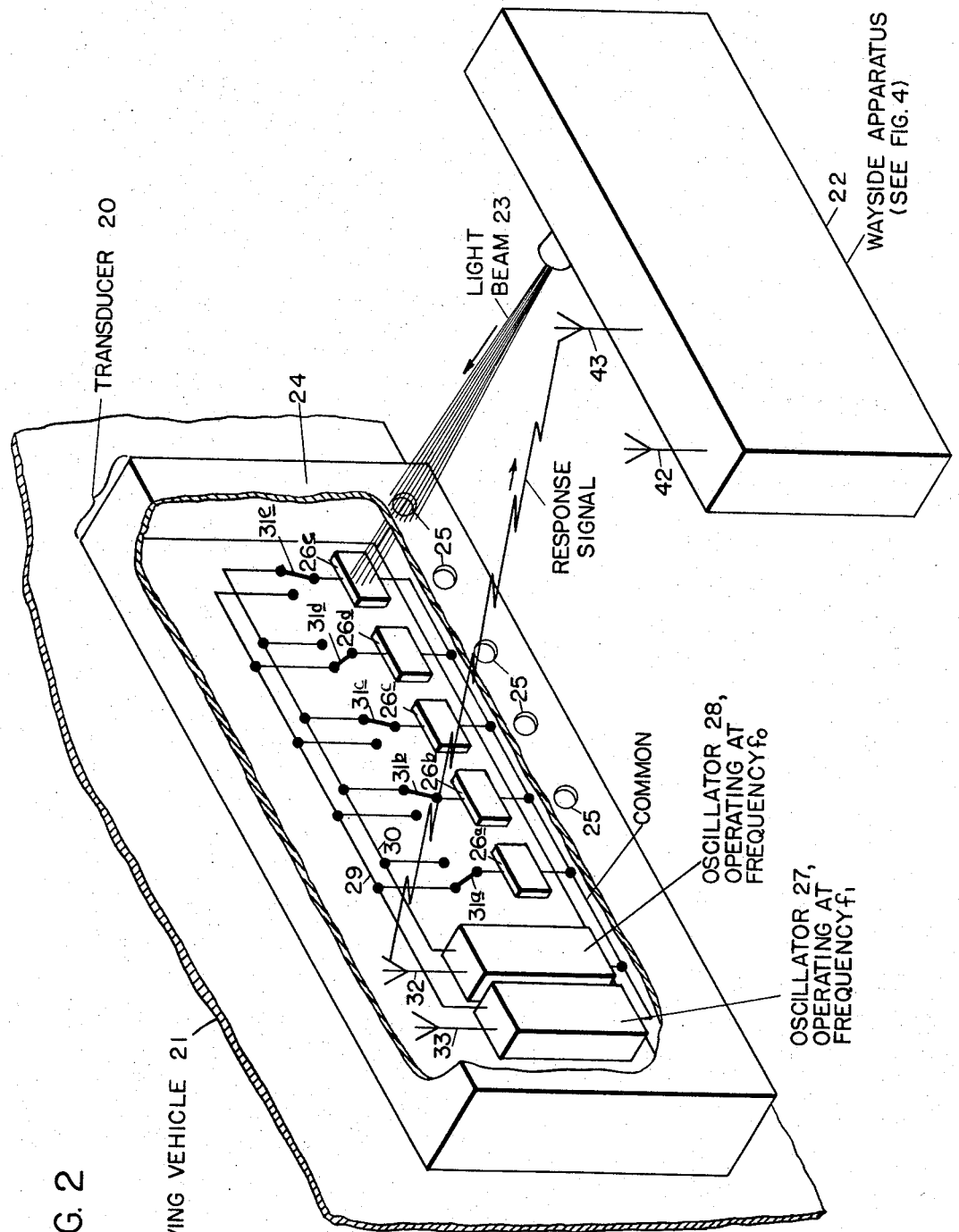
FIG. 2 illustrates the proposed communication system with one form of transducer device embodying the present invention for communicating information from a moving vehicle as it passes a wayside receiving location.

Referring more particularly to FIG. 2, a transducer device 20 constructed in accordance with the present invention is illustrated as being suitably mounted, for example, on the side of a moving vehicle 21, for the purpose of conveying or communicating selected information (such as vehicle identity, etc.) from the vehicle 21 to suitable wayside apparatus 22 (shown in more detail in FIG. 4) as the vehicle passes thereby, in such a manner that the transducer device 20 is scanned by an interrogating light beam 23 emanating from a suitable light source (see FIG. 4) within the wayside receiving apparatus 22. Instead of mounting the transducer device 20 at the side of the vehicle 21, as assumed in FIG. 2, the device 20 might preferably be attached to the underside of the vehicle where it would be less susceptible to tampering, and the interrogating light beam source could then be mounted on the road bed in such manner that it directs the light beam 23 upwardly against the transducer device as the vehicle passes thereover.

More specifically, the transducer device 20 mounted on the vehicle 21 in FIG. 2 comprises a preferably opaque, weatherproof casing 24 which is for the most part impervious to rays of light, but, which does include a plurality of light holes or windows represented collectively by the reference character 25 and spaced from one another to be successively illuminated by the light beam 23, as the vehicle 21 moves past the wayside interrogating location. The vehicle carried responder device 20 furthermore includes a plurality of photoelectric means, such as solar cells or the like designated by the reference characters 26a through 26e in the drawings, each of which is positioned behind one of the windows or light holes 25 in such manner that the solar cells 26a through 26e are successively exposed in sequence to the light beam 23 as the vehicle 21 upon which the transducer is mounted passes the interrogating location. Also included in the transducer device 20 is a pair of electrical signal oscillators 27 and 28 which are capable, when supplied with electrical operating energy, as will be described, of generating frequencies $f_1$ and $f_0$ respectively. The responder device 20 does not carry its own separate electrical power source, but instead, the solar cells 26a through 26e are selectively connected to the bus wires 29 and 30 by switches 31a through 31e, so as to supply converted electrical operating energy to the oscillators 27 and 28 according to a binary code breakdown of the information (e.g. vehicle identity) to be transferred from the vehicle 21 as it passes the interrogating or receiving apparatus 22.

Figure 3:
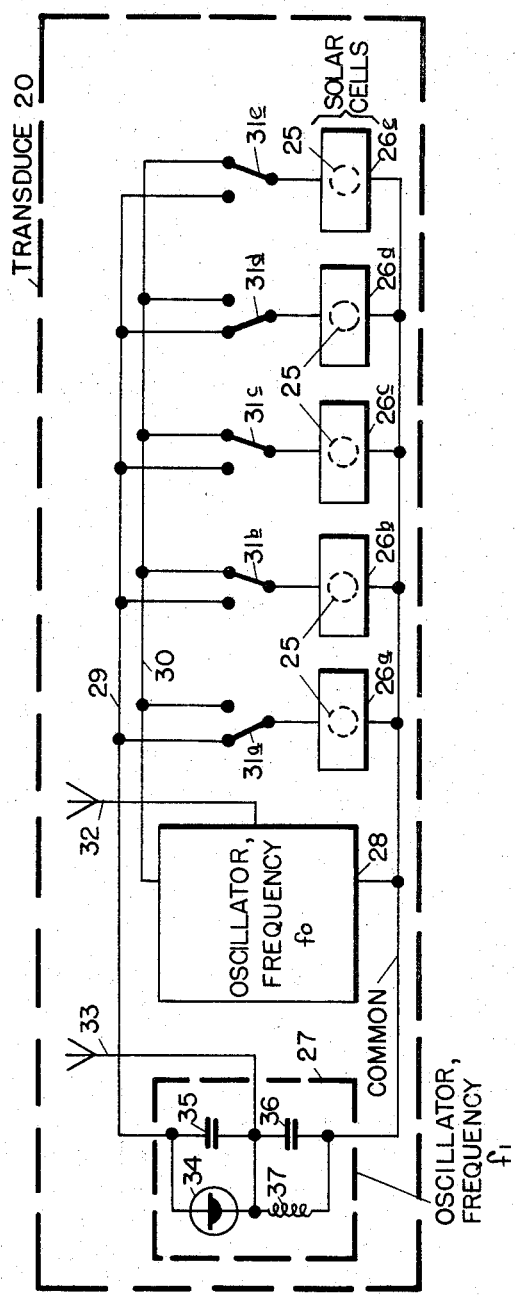
FIG. 3 illustrates in detail the apparatus contained in a vehicle carried transducer according to the same embodiment of the present invention, as shown in FIG. 2.

The transducer circuitry is more specifically illustrated in FIG. 3 of the accompanying drawings with the solar cells 26a through 26e positioned behind the windows or light holes 25 (represented by the dotted circles in FIG. 3) in such a manner that as the vehicle 21 passes the interrogating apparatus, in the left to right direction in FIGS. 2 and 3, the solar cell 26e will first be exposed to the light beam 23 and convert the photic energy thereof into electrical energy, and, because of the preset positioning of switch 31e, the oscillator 28 will then be momentarily supplied with this converted electrical energy (over bus wire 30). Accordingly, the oscillator 28 is rendered effective to generate a corresponding pulse at its frequency $f_0$ for radiation to the wayside interrogating apparatus 22, via its antenna 32. Shortly thereafter, as the transducer 20 continues past light beam 23, solar cell 26d will next be exposed and cause oscillator 27 to momentarily receive electrical operating energy (via bus wire 29) so that it thereby radiates a pulse of its associated frequency $f_1$ from antenna 33. Similarly, because of the positioning of the remaining switches 31c, 31b and 31a, subsequent movement of the transducer device 20 past the interrogating location will next cause two successive pulses of frequency $f_0$ (from oscillator 28), and finally, a pulse of frequency $f_1$ (from oscillator 27). In this manner, it is seen that the oscillators 28 and 27 are sequentially rendered effective or pulsed, in accordance with the selective positioning of the switches 31a through 31e, to radiate a series of pulses in the frequency sequence $f_0$, $f_1$, $f_0$, $f_0$ and $f_1$ to the wayside receiving apparatus 22 as a coded binary character representation, in the form 01001, of the information (e.g. car identity) being conveyed from the passing vehicle 21 to the wayside location. Without in any manner attempting to limit the spirit or scope of the present invention, the particular information conveyed in accordance with the above-mentioned operation might be, for example, representative of a particular number associated with the railway car upon which the transducer 20 is mounted, and, in accordance with which the car is identified upon passing the interrogating location so that such information may be subsequently used for any desired purpose such as, for example, to determine how the particular car will be routed upon entering a classification yard.

However, although the foregoing discussion has assumed that the illustrated switches 31a through 31e might have been preset in accordance with the binary code form of the identity of the particular vehicle upon which the transducer 20 is mounted, it should be understood at this time that, if desired, these switches could instead be controlled (either manually or automatically) to convey other preferred forms of information from the passing vehicle to the interrogating wayside apparatus. For example, if adapted for mounting on railway cars, certain of the switches 31a through 31e might be in the form of themocouples mounted in the journal boxes of the railway car in such manner that distinctive binary pulses, of either frequency $f_1$ or a frequency $f_0$, are communicated to the interrogating apparatus 22 as indication of whether or not the passing car contains any so-called "hot boxes."

A simple, well-known form of oscillator circuit which might be utilized within the vehicle carried transducer device 20, as either of the circuits 28 or 27, is also illustrated in FIG. 3 and includes a tunnel diode 34, capacitors 35 and 36, and inductance 37. This type of oscillator circuit generates a frequency primarily determined by the predetermined values of the capacitor 36 and the inductance 37.

Referring now to FIG. 4 of the accompanying drawings, the interrogating wayside apparatus 22 more particularly contains a suitable power supply 38 capable of furnishing operating energy to the various circuitry, such as light source 39, contained in the wayside apparatus so that such light source continually emits a light beam 23 of suitable size and intensity towards the side of a passing vehicle 21 so that it impinges upon the transducer device 20, carried thereon. Also included in the wayside apparatus 22 are a pair of receivers 40 and 41, connected to suitable antenna 42 and 43, which respond respectively to frequencies $f_1$ and $f_0$ transmitted from the vehicle carried transducer 20, as previously discussed. These receivers 40 and 41 are of well-known construction and are effective, upon receiving the associated frequency pulses as a transducer 20 passes the interrogating location, to produce respective binary output "1" and "0" pulses on output lines 44 and 45 respectively in accordance with the particular sequence in which the frequencies $f_1$ and $f_0$ are received from the passing transducer 20. The "1" and "0" pulses at the outputs 44 and 45 of the receiver apparatus are then supplied to a suitable logic unit designated by the reference character 46 which may be of conventional design effective to serially accept the binary "1" and "0" pulses from the receiver apparatus and to provide appropriate readout at line 47 indicative of the information conveyed from the passing vehicle, which output information can then be supplied to any suitable form of indicating and/or control apparatus, designated as the utilization device 48, desired to be operated in accordance with the conveyed information (e.g. railway car identity) from the passing vehicle.

Figure 6:
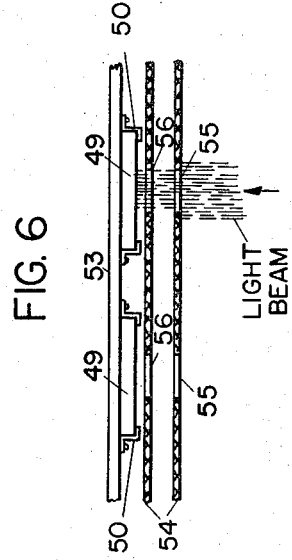
FIG. 6 illustrates a second manner in which the photoelectric means may be mounted within the vehicle carried transducer device.
Figure 5:
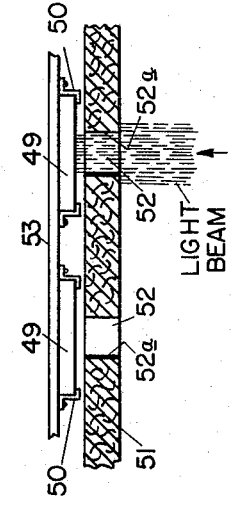
FIG. 5 illustrates one manner in which the photoelectric means may be mounted within the vehicle carried transducer device.

In order to minimize the effects of extraneous light upon the vehicle carried transducer 20, it is desirable that the solar cells, or any other type of photoelectric devices employed, be mounted within the transducer in such manner that they are susceptible only to the interrogating light beam 23. Referring more particularly to FIGS. 5 and 6 of the accompanying drawings, two different methods are illustrated for mounting solar cells, designated at 49, within the car or vehicle carried transducer so as to prevent extraneous light from impinging upon them.

In FIG. 5, the cells 49 are mounted (for example, by brackets 50, on a suitable mounting board 53) behind a relatively thick plate or panel 51 made of opaque material and including a plurality of light holes or windows 52 for successively exposing the solar cells to the interrogating light beam. The light holes 52 are preferably aligned so that the light beam from the wayside passes in an axial direction through them and the inner wall 52a of each of the light holes is then painted black or some other light absorbing color effective to prevent any extraneous light (which for the most part would be entering at an angle relative to a light hole 52) from reaching or impinging upon the associated solar cell 49. It should be understood at this time that the plate or panel referred to in FIG. 5 by the reference character 51 may or may not also serve as the weatherproof casing for the car carried transducer device, depending upon the particular requirements of practice.

In FIG. 6, the solar cells 49 are attached to mounting board 53, behind a pair of relatively thin opaque plates or cards 54 which are preformed with suitable axially aligned inner and outer light holes therein and which are spaced from one another by a sufficient distance so that any extraneous light entering an outer light hole 55, at an angle, would be trapped and/or absorbed between the two cards 54 and thereby prevented from passing through the inner light hole 56 disposed directly in front of the solar cell 49. Here again, the relatively thin cards or plates referred to at 54 in FIG. 6, may or may not also form the outer casing for the car carried transducer device.

Referring once again to FIGS. 2 and 3 of the accompanying drawings, the embodiment illustrated therein assumes the use of a plurality of solar cells 26a through 26e mounted in a single longitudinal row within the car carried transducer 20. However, for the purpose of possibly reducing the expense of the transducer device, this single row of solar cells may be replaced, if desired, by two relatively long solar cells or the like as noted for example, in FIG. 7 of the accompanying drawings, by the reference characters 57 and 58, selectively connected by bus wires 59 and 60 to pulse oscillators 61 and 62 respectively. A suitable opaque plate 63 is mounted in front of the solar cell pair 57–58 and includes a plurality of light holes or windows 64 prearranged thereon in coded fashion so that the solar cells 57 and 58 are sequentially illuminated by the light beam 65 as the transducer device of FIG. 7 passes the interrogating wayside location, to successively power the oscillators 61 and 62 selectively to cause them to radiate their respective frequencies $f_0$, $f_1$, $f_0$, $f_0$ and $f_1$ as the transducer device moves past the interrogating light beam 65 from left to right as viewed in FIG. 7. It should be noted that the transducer device illustrated in the modification of FIG. 7 is thus capable of producing the same coded binary signal, for radiation to the wayside interrogating apparatus, as that produced by the transducer of FIG. 2, but, requiring only a pair of solar cells, as opposed to the five solar cells 26a through 26e required in the form shown in FIG. 2.

Obviously, rather than utilizing two relatively long solar cells as illustrated in FIG. 7, it may be desirable to incorporate a suitable light reflecting structure (such as a pair of parabolic mirrors, etc.) mounted behind the coded panel 63 in such manner that the light beam 65 passing through the coded light holes 64 is sequentially directed to impinge upon one or the other of a pair of solar cells mounted at the respective focal points of the reflector structure. In this case, the solar cells could be kept relatively small in size.

FIG. 8 of the accompanying drawings illustrates a modification to the illustrated embodiment which is slightly different than that previously discussed and shown in FIGS. 2, 3 and 4. More particularly, in the modification of FIG. 8, the car carried transducer comprises a pair of solar cells 66 and 67 mounted one above the other behind an opaque card or plate 68 preformed with an upper row of light holes exposing the upper solar cell 66 to the wayside light beam 69 according to a coded binary representation of the information (e.g. vehicle identity) to be conveyed to the illustrated wayside apparatus, and, with a lower row of light holes arranged at equally spaced intervals along the plate 68 to repeatedly expose the lower cell 67 to the wayside light beam 69 as the transducer passes thereby, for example, in a left to right direction in FIG. 8. The upper solar cell 66 is more particularly connected to supply pulses of operating electrical energy to the oscillator 70 over bus wire 71; whereas, the lower solar cell 67 supplies pulses of electrical operating energy to the oscillator 72, via bus wire 73.

The resulting $f_1$ and $f_0$ frequency pulses generated by the oscillators 70 and 72 respectively are received at the wayside interrogating location by receivers 74 and 75 respectively. At the output 76 of the receiver 75, a series of spaced "clock" pulses are developed; whereas, at the output 77 of the receiver 74, a series of binary "1" pulses are generated in accordance with the information being conveyed from the passing transducer; i.e. a "1" pulse appears at output 77 for each pulse of frequency $f_1$ received by receiver 74. These "clock" and "1" pulses are supplied as inputs to a conventional seven-stage shift register circuit 78 (including stages 78a through 78g) effective to serially accept the binary "1" pulses being produced at the wayside receiver 74; which binary pulses are successively advanced within the shift register circuit 78 by the "clock" pulses from the receiver 75.

More particularly and with reference to the vehicle carried transducer device illustrated in FIG. 8, the opaque coded plate 68 is divided into a plurality of successive coded areas each marked by one of the successive "clock" light holes in the lower row. The binary code of the information to be conveyed is then serially coded on the plate 68 in the form of binary ones and zeroes, in accordance with whether or not a corresponding light hole appears in the upper row, for each of the successive plate areas.

In FIG. 8 it will be noted, for example, that there are nine such successive areas on the transducer plate 68. Of these, only the middle five are utilized to convey the actual vehicle identity information to the wayside in the form of a 0, 1, 0, 0, 1 binary code; whereas, the outer two areas at each end of the transducer plate 68 are utilized, as will be discussed, to distinguish the beginning and end of the identity information being conveyed.

More specifically, as the binary pulse information (on output line 77) is being serially applied to the shift register circuit 78, readout of the registered information is initiated upon detection, in the last or right-hand stage 78g of the shift register, of the first inserted binary information which, in this case is always a "1" pulse. This is the reasoning behind placing a "1" light hole at each end of the upper row in transducer plate 68, so that the system can readily detect when all of the identity code has been registered on the wayside.

Since the information (car or vehicle number, for example) being serially transferred and/or accepted from the passing vehicle would normally be orientated for a given direction of vehicle travel, the shift register readout operation occurs through a five-stage switching circuit 79 whose purpose is to permit proper readout of the registered vehicle identity information irrespective of the direction of travel of the passing vehicle. More particularly, the next to the last stage 78f of the shift register 78 (second from the right in FIG. 8) will or will not be registering a binary "1" pulse depending respectively upon whether the passing vehicle is moving in one direction or the other when being interrogated. This is accomplished by indexing the coded plate 68 with a hole (a binary "1" in the second position from the right-hand end of the upper row in FIG. 8 and no light hole (a binary "0" in the second position from the left-hand end of the upper row.

As noted in FIG. 8, when the readout operation from the shift register 78 is initiated from the output line 80, the next to the last register stage 78f (containing the directional information) is read out prior to the remaining stages 78a through 78e (to the left), and, controls the switching circuit 79 accordingly to one or the other of its two operating conditions whereby the identity information (in stages 78a through 78e) will be supplied to the suitable utilization apparatus 81 in a left to right or right to left sequence, depending upon whether the transducer information was presented to wayside in a predetermined forward or reverse direction. In order to insure operation of the switching circuit 79 prior to readout from the shift register stages 78a through 78e, a delay circuit 82 is incorporated in the readout initiate circuitry. In FIG. 8, the utilization apparatus designated at 81 may take any suitable form such as a typewriter, teletype, magnetic recorder or any other suitable indicating and/or control apparatus to be operated in accordance with the identity of a vehicle passing the interrogating location.

In the above discussions relating to the different forms of vehicle or car carried transducer device, the actual information being conveyed to the wayside was assumed to be in the form of a binary code containing five binary digits or bits. However, this relatively short binary code was selected merely for the purpose of disclosure and obviously, the particular information being conveyed to the wayside may, in practice, include many more binary digits. For example, by utilizing twenty such binary digits the system according to the illustrated embodiment of the present invention would be able to properly identify over one million different railway cars.

When discussing the embodiments illustrated in FIGS. 2 through 8, it has been furthermore assumed that the interrogating or command light beam originated at a fixed or stationary wayside source and that the successive exposures of the solar cell(s) behind the transducer light holes resulted from the fact that the transducer device is mounted on a moving vehicle (e.g. railway car). However, it is readily appreciated that this successive and interrupted exposing of the solar cell(s) to the light beam could also be accomplished, without requiring vehicle movement, by instead causing the light beam to move or swing across, i.e. to scan, the transducer light holes in succession; and furthermore, without attempting to limit the spirit or scope of the invention, it is equally appreciated that this scanning could be accomplished with the light holes arranged in either a horizontal or vertical row. In practice, the vertical displacement of the transducer light holes might be preferable inasmuch as the transducer device would then be scanned vertically by the light beam and thus, the interrogation of the information coded at the transducer would be insensitive to the direction of travel of the vehicle upon which the transducer is mounted.

As previously pointed out, in preference to having the electrical energy pulses generated in the transducer device by sequentially scanning the interrogating light beam (either with or without actual movement of the transducer) relative to a row of light holes formed in an opaque card or plate disposed between the light source and one or more photoelectric energy converting devices (such as solar cells or the like), a single, continuously exposed solar cell can be utilized to cyclically operate or power suitable pulse generating circuitry self-contained in the transducer and effective to generate a series of time spaced electrical pulses which are, in turn, selectively applied to the transducer oscillator pair to thereby cause the generation of the desired coded binary representation of the information to be communicated between the first and second locations.

More particularly, this form of transducer is illustrated in FIG. 9 of the drawing and includes a single photoelectric energy converting device (e.g. solar cell or the like) designated by the reference character 83 which is exposed to the interrogating or command light beam 84 whenever communications are to be established between location "A" and some other location "B." The electrical energy output of the photoelectric device 83 is applied to suitable trigger pulse generating circuitry 85 of any well known form which, as a result, generates an output trigger pulse of electrical energy.

Also included in the transducer device of FIG. 9 is suitable delay line circuitry 86 effective, when supplied with the output trigger pulse from circuitry 85, to cause output electrical pulses to appear at its respective output connections or tap-off points 87a through 87e, one after another in sequence. The delay line circuitry 86 may be of any well-known construction such as, for example, a suitable electromagnetic delay line, a plurality of cascade transistor time delay circuits, etc. These respective delay line outputs 87a through 87e are selectively connected, through suitable switches 88a through 88e, to the bus wires 89 and 90 leading respectively to oscillator 91 which operates at a frequency $f_0$ and oscillator 92 operating at a frequency $f_1$. These switches 88a through 88e are pre-positioned or programmed in accordance with a binary code of the information to be communicated, in exactly the same manner previously set forth when discussing the positioning of switches 31a through 31e contained in the transducer device 20 of FIGS. 2 and 3.

Accordingly, it should be readily apparent from FIG. 9, that while light beam 84 impinges upon the photoelectric device 83, the trigger pulse from circuitry 85 is applied to the input or right-hand end of delay line circuitry 86 and will first appear at output 87a for application (over switch 88a and bus wire 89) to oscillator circuitry 91 which thereby generates a pulse of frequency $f_0$ for transmission, via its antenna 93, as the initial part of the response signal 94 communicated back to suitable receiving apparatus (not shown) at the other location "B." Without in any way attempting to limit the spirit or scope of the present invention, this receiving apparatus at location "B" may be substantially the same as that shown on the wayside in FIG. 4 of the drawings and including a separate receiver for each of the frequencies generated within the transducer at location "A" and suitable logic circuitry.

Subsequently, after a predetermined time delay established by the operating characteristics of delay line circuitry 86, the trigger pulse will have progressed further in the delay line circuitry and accordingly cause an output pulse to appear at output point 87b which, in turn, is routed over switch 88b and bus wire 90 to momentarily trigger oscillator 92 into operation to generate an output pulse of frequency $f_1$ for transmission, over an antenna 95, as the next part of the response signal being communicated to location "B." Similarly, the remaining switches 88c through 88e are so pre-positioned that, as the subsequent delay line output pulses appear successively at points 87c, 87d and 87e, two successive pulses of frequency $f_0$ are next generated by oscillator 91 in accordance with the two pulses of electrical operating energy received over switches 88c and 88d respectively; whereas, a final pulse of frequency $f_1$ is generated by oscillator 92 when supplied with the pulse of electrical operating energy via switch 88e.

Thus, the entire response signal communicated between location "A" and location "B" comprises a coded series of pulses in the frequency sequence $f_0, f_1, f_0, f_0$ and $f_1$ which is exactly the same form of binary code transmitted by the transducer device illustrated in FIGS. 2 and 3, but here, the coded pulse series representing the information being conveyed is obtained without requiring relative motion between the transducer device and the interrogating or command light beam; i.e. the transducer device itself contains circuitry for generating the series of time spaced electrical energy pulses required to operate or power the oscillator circuits.

A portion of the apparatus at location "B" is illustrated in FIG. 9 and includes light beam source 96 which generates light beam 84 when supplied with operating power from a suitable power source (see FIG. 4, for example). A suitable control switch 97 (which can be operated either manually or by automatic means) is shown connected between the light beam source 96 and its power supply; whereby the light beam source 96 may be turned on and off, as desired, so that for example, the light beam 84 is directed from location "B" and onto the transducer device of location "A" only when it is desired to initiate transmission of the transducer response signal in accordance with the predetermined information being communicated from location "A" to location "B."

Having thus described various specific embodiments of an information communicating system and apparatus according to the present invention, it should be understood at this time that the illustrated forms have been selected merely for the purpose of disclosure and that various other modifications, adaptations and alterations, in addition to those specifically described in the foregoing specification, may be applied to the forms shown without in any manner departing from the spirit or scope of the present invention.

What is claimed is:

1. In a system for communicating selected information between first and second locations, the combination of,
    (a) signal generating means at said first location effective when supplied with electrical operating energy to generate a signal output distinctive of said selected information to be communicated to said second location,
    (b) photoelectric conversion means effective when supplied with photic energy to convert said photic energy into said electrical operating energy capable of causing said signal generating means to generate said distinctive signal output, and
    (c) a source of photic energy effective selectively to supply said photic energy to said photoelectric conversion means when said first location is to communicate with said second location.

2. The combination specified in claim 1 wherein said signal generating means comprises electrical operated circuitry rendered effective by the electrical operating energy produced at said photoelectric conversion means from said photic energy to produce a series of output signal pulses coded in accordance with the selected information to be communicated from said first location to said second location.

3. The combination specified in claim 2 wherein said output signal pulse producing circuitry includes,
    (a) a pair of electrical oscillator circuits each having a different operating frequency and each rendered effective to produce an output signal of its operating frequency when supplied with electrical operating energy,
    (b) pulse generating means effective while said photoelectric conversion means is being supplied with said photic energy to generate a series of pulses of electrical operating energy, and
    (c) switching means effective to selectively route each of the pulses in said series of electrical operating energy pulses to said pair of oscillator circuits, whereby said oscillator circuits are selectively rendered effective in sequence to collectively generate a series of output signal pulses of their respective operating frequencies as a binary code representation of said selected information to be communicated.

4. In a system for communicating selected information between first and second locations, the combination of,
    (a) a pair of electrical oscillator circuits at said first location each having a different operating frequency and each being rendered effective to produce an output signal pulse of its operating frequency when supplied with a pulse of electrical operating energy,
    (b) pulsing means rendered effective when supplied with photic energy to generate a series of time spaced pulses of electrical operating energy,
    (c) switching means effective to selectively route each of the pulses in said series of electrical operating energy pulses to said pair of oscillator circuits, whereby said oscillator circuits are selectively rendered effective in sequence to collectively generate a series of output signal pulses of their respective operating frequencies as a binary code representation of said selected information to be communicated, and
    (d) a source of photic energy effective to supply said photic energy to said pulsing means when said first location is to communicate with said second location.

5. The combination specified in claim 4 wherein said pulsing means comprises a plurality of photoelectric devices each effective when exposed to photic energy to convert said photic energy into electrical energy and being arranged to be momentarily exposed to said photic energy source one after another in succession so as to generate collectively a series of electrical operating energy pulses, said photoelectric devices furthermore being connected electrically by said switching means to supply said generated electrical operating energy pulses selectively to said pair of electrical oscillator circuits in accordance with the binary code of said selected information.

6. The combination specified in claim 4 wherein said pulsing means comprises pulse generating circuitry effective when supplied with electrical energy to operate through a predetermined cycle during which it produces a series of time spaced pulses of electrical operating energy at its output, and a single photoelectric device operatively connected to said pulse generating circuitry and effective when receiving said photic energy to convert said photic energy into the electrical energy necessary to cause the cycling of said electrical pulse generating circuitry, the output of said pulse generating circuitry being connected electrically by said switching means to said pair of oscillator circuits whereby said time spaced pulses of electrical operating energy are selectively routed to operate said pair of oscillators in accordance with the binary code of said selected information.

7. The combination specified in claim 6 wherein said pulse generating circuitry includes,
    (a) first circuit means effective when supplied with electrical energy from said photoelectric device to produce an electrical trigger pulse, and
    (b) delay line circuit means having an input and a plurality of output connections effective when supplied at its input wtih said trigger pulse to produce an output pulse of electrical energy at one after another of its respective output connections in succession, the output connections of said delay line means being selectively connected electrically by said switching means to said oscillator pair to supply said output electrical energy pulses thereto in accordance with the binary code of said selected information.

8. In a system for communicating selected information between first and second spaced locations, the combination of, (a) signal generating means at said first location effective when supplied with electrical operating energy to generate a signal output distinctive of said selected information to be communicated to said second location, (b) photoelectric conversion means at said first location effective while receiving photic energy to convert said photic energy into electrical energy capable of operating said signal generating means to generate said distinctive signal output, and (c) a source of photic energy spaced from said first location and rendered effective when said first location is to communicate with said second location to transmit said photic energy to said photoelectric conversion means.

9. The combination specified in claim 8 wherein said photic energy source is disposed at said second location.

10. The combination according to claim 9 further including control switch means for selectively rendering said photic energy source effective and ineffective to transmit said photic energy to said photoelectric conversion means dependent respectively upon whether or not said first location is to communicate said selected information to said second location.

11. In a system for communicating selected information between first and second relatively moving objects as they pass one another, the combination of, (a) signal generating means on a first of said objects effective when supplied with electrical operating energy to generate a signal output distinctive of the selected information to be conveyed to the second of said objects, (b) photoelectric conversion means on said first object effective when exposed to photic energy to convert said photic energy into electrical energy capable of operating said signal generating means to generate said distinctive signal output, and (c) means including a source of photic energy on said second object effective while said objects are passing one another for exposing said conversion means to the photic energy from said source, whereby said distinctive output signal is generated while said objects are passing one another.

12. The combination specified in claim 11

(a) wherein said signal generating means is a pair of electrical signal oscillators each of different operating frequency and each being rendered effective to generate an output signal of its operating frequency while supplied with electrical operating energy, and (b) wherein said photoelectric conversion means are effective when exposed to photic energy to supply pulses of electrical operating energy selectively to said oscillator pair in a predetermined sequence according to a coded binary representation of the selected information to be conveyed to the second of said objects.

13. In a system for communicating selected information between first and second relatively moving objects as they pass one another, the combination of, (a) signal generating means on said first object including a pair of electrical signal oscillators each of different operating frequency and each being rendered effective to generate an output signal of its operating frequency signal when supplied with electrical operating energy, (b) a source of energy on said second object, (c) energy transfer means partly on each of said objects effective while said objects are passing one another to transfer the energy produced at said source to said first object, (d) pulsing means on said first object responsive to said transferred energy for transforming said transferred energy into a series of time spaced pulses of electrical operating energy, and (e) switching means for supplying the individual pulses in said series selectively to said oscillator pair according to a binary code of the predetermined information to be communicated from said first object to said second object.

14. In a system for communicating information between first and second spaced locations, the combination of, (a) first and second signal generating means at said first location effective when supplied with energy to generate distinct first and second output signals respectively, (b) a source of energy at said second location, (c) energy transfer means effective to transfer said source of energy from said second location to said first location when said first location is to communicate with said second location, and (d) means at said first location for supplying the transferred energy selectively in pulses to said first and second signal generating means according to a predetermined sequence selected in accordance with a binary code of the information to be communicated from said first location to said second location.

15. A transducer device adapted to be positioned at a first location for communicating selected information from said first location to a second location spaced therefrom in response to command energy transmitted from said second to said first location, said transducer comprising, (a) first signal generating means effective when supplied with operating energy to generate an output signal of a first distinctive character, (b) second signal generating means effective when supplied with operating energy to generate an output signal of a second distinctive character, (c) pulse series producing means responsive to the command energy transmitted from said second location for transforming said command energy into a series of time spaced pulses of said operating energy, and (d) switching means for supplying the individual pulses in said series selectively to said first and second signal generating means according to a binary code of the selected information to be communicated from said first location to said second location.

16. A transducer device adapted to be carried on a moving vehicle for communicating selected information from said vehicle as it passes a predetermined wayside location at which is disposed a wayside source of energy effective to direct its energy toward said passing vehicle, said transducer comprising, (a) first and second signal generating means each having an output signal of different character and each being rendered effective to generate its output signal when operating energy is applied thereto, (b) pulsing means effective while said vehicle is passing said wayside location to transform the energy directed from said wayside source into a series of time spaced pulses of said operating energy, and (c) switching means for applying the individual timed spaced pulses of operating energy in said series selectively to said first and second signal generating means in accordance with a predetermined binary code of the selected information to be communicated from said vehicle, whereby said first and second signal generator means are rendered effective to collectively generate a transducer signal made up of binary coded series of their respective output signals.

17. The transducer device according to claim 16 wherein said pulsing means includes a plurality of devices arranged to pass said wayside energy source one after another in succession and each being effective while passing said wayside source to transform the energy directed therefrom into a pulse of operating energy for application, via said switching means, to a selected one of said signal generator means.

18. The transducer device according to claim 16 wherein said pulsing means comprises,
(a) a trigger pulse generating means effective while said vehicle is passing said wayside location to transform the energy directed from said wayside energy source into a trigger pulse of said operating energy, and
(b) means responsive to said trigger pulse effective to generate therefrom a series of time spaced pulses of said operating energy for selective application, via said switching means, to said first and second signal generator means.

19. A transducer device adapted to be carried on a moving vehicle for communicating selected information from said vehicle as it passes a predetermined location at which is disposed a light source effective to direct a light beam towards said passing vehicle, said transducer comprising,
(a) electrically operated signal generating means effective when supplied with electrical operating energy to generate a signal output distinctive of the selected information to be conveyed to said location, and
(b) photoelectric means positioned so as to be exposed to said directed light beam as said vehicle passes said location and effective when so exposed to convert the photic energy of said light beam into electrical operating energy capable of causing said signal generating means to generate said distinctive signal output.

20. A transducer device adapted to be carried on a moving vehicle for communicating selected information from said vehicle as it passes a predetermined wayside location at which is disposed a wayside light source effective to direct a light beam toward said passing vehicle, said transducer comprising,
(a) a pair of electrical oscillator circuits each having a different operating frequency and each being rendered effective to produce an output signal pulse of its operating frequency when supplied with a pulse of electrical operating energy,
(b) pulsing means rendered effective when exposed to said wayside light beam to produce a series of time spaced pulses of electrical operating energy, and
(c) switching means effective to route each of the pulses in said series of electrical operating energy pulses selectively to said pair of oscillator circuits, whereby said oscillator circuits collectively generate a transducer output signal made up of a series of pulses of the respective oscillator frequencies in a coded binary sequence.

21. The transducer device according to claim 20 wherein said pulsing means comprises a plurality of photoelectric devices arranged to be momentarily exposed in succession to said wayside light beam as said vehicle passes said wayside location and each being effective when so exposed to produce therefrom a corresponding pulse of electrical operating energy, said plurality of photoelectric devices being connected electrically by said switching means to selectively supply said produced pulses of electrical energy to said pair of oscillator circuits in accordance with a binary code of said selected information.

22. A transducer device adapted to be carried on a moving vehicle for communicating selected information from said vehicle as it passes a predetermined wayside location at which is disposed a wayside light source effective to direct a light beam towards said passing vehicle, and transducer comprising,
(a) first and second electrical oscillator circuits effective when supplied with electrical operating energy to generate output signals of first and second operating frequencies respectively,
(b) first and second photoelectric devices electrically connected to supply electrical operating energy respectively to said first and second oscillator circuits when exposed to said wayside light beam, and
(c) light directing means effective while said vehicle is passing said wayside location to direct the light beam from said wayside source selectively to said first and second photoelectric means according to a predetermined binary code of the selected information to be communicated from said vehicle.

23. The transducer device according to claim 22 wherein said light directing means is an opaque structure disposed between said photoelectric devices and said wayside light beam and including a plurality of light holes arranged therein according to said predetermined binary code so as to selectively expose said first and second photoelectric devices to said wayside light beam as said vehicle passes said wayside location.

24. The transducer device according to claim 23 wherein said opaque structure is a relatively thick opaque plate having a plurality of light holes formed therein, each of said light holes being in substantial axial alignment with the light beam from said wayside source and having a light absorbent inner wall whereby said photoelectric devices are rendered substantially inaccessible to light from sources other than said light beam source.

25. The transducer device according to claim 23 wherein said opaque structure comprising a pair of relatively thin opaque plates spaced from one another by a predetermined distance and each having an equal plurality of light holes formed therein as axially aligned inner and outer pairs, each of said light hole pairs being in substantial axial alignment with the light beam from said wayside source whereby said photoelectric devices are rendered substantially inaccessible to light from sources other than said light beam source.

26. In a transducer device for generating an electrical coded binary output signal made up of spaced binary digits in response to a command light beam directed towards said transducer device, the combination of,
(a) photoelectric means effective to convert the photic energy of said light beam into a pulse of electrical operating energy for each digit of said output signal,
(b) signal generating circuit means operable to first and second operating conditions in accordance with the selective application thereto of each pulse of said electrical operating energy, the first and second operating conditions of said signal generating circuit means producing first and second distinct signal outputs respectively recognizable as distinct binary code characters, and
(c) means effective to cause the selective application of each pulse of electrical operating energy produced by said photoelectric means to said signal generating circuit means to selectively render it operative in said first and second operating conditions according to a predetermined binary code.

27. The combination specified in claim 26 wherein,
(a) said photoelectric means is a plurality of photoelectric devices arranged to be momentarily exposed one after another in succession to said light beam so as to generate successive pulses of electrical operating energy,
(b) said signal generating means is a pair of electrical oscillator circuits each having a different operating frequency when electrical operating energy is applied thereto, and
(c) said pulse applying means includes a plurality of two position switching devices each of which electrically connects one of said photoelectric devices to a selected one of said oscillator circuit pair.

28. The combination specified in claim 26 wherein,
(a) said signal generating means comprises first and second electrical oscillator circuits each having a different operating frequency when electrical operating energy is applied thereto, (b) said photoelectric means comprises first and second photoelectric devices respectively connected electrically to said first and second oscillator circuits and, (c) said pulse applying means includes light directing means effective to
  (1) momentarily direct said light beam to said first photoelectric device for each digit in said binary code whereby said first oscillator circuit is intermittently rendered effective to generate successive time spaced clock pulses of its operating frequency to mark each digit, and
  (2) selectively direct said light beam to said second photoelectric device for selected digits, in said binary code whereby said second oscillator circuit is selectively rendered effective and ineffective to generate its operating frequency depending upon the binary character of each digit in said code.

29. The combination specified in claim 26 wherein,
(a) said signal generating means comprises first and second electrical oscillator circuits each having a different operating frequency when electrical operating energy is applied thereto,
(b) said photoelectric means comprises first and second photoelectric devices respectively connected electrically to said first and second oscillator circuits, and
(c) said pulse applying means includes light directing means effective to direct said light beam selectively to said first and second photoelectric devices in coded sequence.

30. A transducer device for generating a distinctively coded signal output made up of spaced binary digits in response to a command light beam directed toward said transducer, said transducer comprising,
(a) first and second electrical oscillator circuits each having a different operating frequency and each being rendered effective to generate an output signal of its operating frequency when supplied with electrical operating energy,
(b) photoelectric means effective when exposed to said command light beam to convert the photic energy of said light beam into electrical operating energy,
(c) a generally opaque structure interposed between said photoelectric means and said command light beam including a plurality of light holes formed therein effective to intermittently expose said photoelectric means to said command light beam for each binary digit of said coded signal output, whereby said photoelectric means is effective to produce a corresponding pulse of electrical operating energy for each binary digit, and
(d) circuit means electrically connecting said photoelectric means and said first and second oscillator circuits, whereby each pulse of electrical operating energy is supplied selectively to one or the other of said first and second oscillator circuits according to a predetermined binary code sequence and whereby said oscillator circuits collectively generate a series of pulses of their respective operating frequencies as said distinctively coded signal output.

31. The system comprising an interrogating means and a responding means, one of which is disposed on a moving vehicle and the other of which is disposed at a fixed wayside location, for communicating selected information between said moving vehicle and said fixed wayside location as said vehicle passes said location,
(a) said responding means comprising,
  (1) photoelectric energy conversion means effective when exposed to a light beam to convert the photic energy of said light beam into electrical operating energy, and
  (2) electrically operated signal transmitting circuit means operably connected to said photoelectric means effective when supplied with said electrical operating energy to transmit a response signal distinctively coded in accordance with said selected information to be communicated, and
(b) said interrogating means comprising,
  (1) a light source effective while said vehicle is passing said wayside location to direct a beam of light onto said photoelectric means whereby said light beam is converted into electrical operating energy for causing said distinctively coded response signal to be transmitted by said signal transmitting circuit means, and
  (2) means for receiving and decoding the response signal transmitted by said transmitting circuit means.

32. The communication system according to claim 31 wherein said responding means is a transducer device adapted to be carried on a moving vehicle and effective when passing a wayside light source to radiate a distinctively coded response signal representative of selected information to be communicated from the vehicle to the wayside.

33. In a system for communicating selected information between first and second spaced locations in the form of a series of time spaced code digits, the combination of,
(a) a plurality of electrical oscillator circuits at said first location each having a different operating frequency and each being rendered effective to produce an output signal of its operating frequency when supplied with electrical operating energy,
(b) a plurality of photoelectric devices each effective when exposed to a light beam to convert the photic energy of said light beam into electrical operating energy,
(c) a light beam source adapted to scan across said plurality of photoelectric devices one after another in succession to thereby produce a series of time spaced pulses of electrical operating energy, and
(d) switching circuit means electrically connecting said photoelectric devices and said plurality of oscillator circuits to selectively route the pulses of electrical operating energy to said oscillator circuits, whereby said oscillator circuits are selectively rendered effective in sequence to collectively generate a series of time spaced output signal pulses of their respective operating frequencies as a coded representation of said selected information to be communicated.

34. The system comprising an interrogating means and a responding means, one of which is disposed on a moving vehicle and the other of which is disposed on a fixed wayside location, for communicating selected information between said moving vehicle and said fixed wayside location as said vehicle passes said location,
(a) said responding means comprising,
  (1) a plurality of photoelectric devices arranged to be successively exposed to a relatively moving light beam directed thereto so as to produce therefrom pulses of electrical operating energy at successively spaced time intervals, and
  (2) electrically operated signal transmitting circuit means operable to first and second binary signal transmitting conditions wherein distinct first and second output signals are respectively transmitted thereby in accordance with the selective application thereto of electrical operating energy and being selectively connected electrically to said photoelectric devices to be applied with the pulses of electrical operating energy in accordance with a predetermined binary code of the selected information to be communicated so as to be rendered effective at said successive time intervals to transmit a corresponding series of time spaced binary code digits consisting of successive pulses of said first and second output signals, and (b) said interrogating means comprising,
  (1) a light source effective while said vehicle is passing said wayside location to direct a beam of light onto said plurality of photoelectric devices in succession whereby said photoelectric devices are rendered effective to produce said time spaced pulses of electrical operating energy and whereby said transmitting circuit means is rendered effective to transmit said series of time spaced binary code digits representing said selected information, and
  (2) means distinctively responsive to the output signals of said transmitting circuit means for receiving and decoding the series of time spaced binary code digits transmitted by said transmitting circuit means while said vehicle is passing said wayside location.

35. The system according to claim 34 wherein said signal transmitting circuit means comprises first and second oscillator circuits each having a different operating frequency and each being electrically connected to said photoelectric devices selectively to receive selected ones of the pulses of electrical operating energy in said series produced by said photoelectric devices, whereby said transmitted signal consists of successive pulses of the respective operating frequencies of said first and second oscillator circuits.

36. The system according to claim 34 wherein said signal transmitting circuit means comprises,
  (a) a first oscillator circuit having a first operating frequency electrically connected to said photoelectric devices to receive a pulse of electrical operating energy at each of said successively spaced time intervals so as to produce an output signal pulse of said first frequency to mark each of said time spaced binary code digits, and
  (b) a second oscillator circuit having a second operating frequency selectively connected to receive selected ones of said pulses of electrical operating energy produced by said photoelectric devices, whereby said second oscillator circuit is selectively rendered effective and ineffective to produce an output pulse signal of its second operating frequency depending upon the binary character of each binary code digit in said transmitted signal.

37. The system according to claim 34 for automatically interrogating the identity of a vehicle as it passes a predetermined wayside location, wherein,
  (a) said interrogating means is disposed on the wayside at said predetermined location such that said light source is effective to direct a beam of light toward said vehicle as it passes thereby,
  (b) said responding means is a transducer device adapted to be carried on said vehicle such that said photoelectric devices are exposed to said light beam as said vehicle passes said location and including a pair of oscillator circuits in said response signal transmitting circuitry each having a different operating frequency when supplied with electrical operating energy and being selectively connected electrically with said photoelectric devices to be supplied with the time spaced pulses of electrical operating energy from said photoelectric devices selectively according to a predetermined binary code of a distinctive identity designation for said vehicle, whereby a series of time spaced pulses of said different oscillator frequencies are transmitted from said transducer as said vehicle passes said location representing the distinctive identity of said vehicle in said predetermined binary code form, and
  (c) said receiving and decoding means are disposed at said wayside location effective to receive and decode the distinctive identity information transmitted from said passing vehicle as said predetermined binary coded response signal.

38. The system comprising an interrogating means and a responding means, one of which is disposed on a moving vehicle and the other of which is disposed at a fixed wayside location, for communicating selected information between said vehicle and said fixed wayside location as said vehicle passes said location,
  (a) said responding means comprising,
    (1) photoelectric circuit means effective when exposed to a light beam to convert the photic energy of said light beam into a series of time spaced pulses of electrical operating energy, and
    (2) electrically operated response signal transmitting circuit means operably connected electrically to be supplied with the series of electrical operating energy pulses from said photoelectric circuit means, whereby said transmitting circuit means is rendered effective to transmit a series of time spaced response signal pulses representing a digital code of said selected information to be communicated, said response signal including directional information at certain of its time spaced code digits for distinguishing one end of said response signal from the other in accordance with the proper sequence in which said response signal is to be interpreted,
  (b) said interrogating means comprising,
    (1) a light source effective while said vehicle is passing said wayside location to direct a beam of light onto said photoelectric circuit means whereby said series of time spaced pulses of electrical operating energy is produced by said photoelectric circuit means to cause the transmission of said digitally coded response signal by said signal transmitting circuit means, and
    (2) means for receiving and decoding the digitally coded response signal, including directional decoding means distinctively responsive to the directional code digits in said response signal whereby said selected information is properly interpreted irrespective of the relative direction of travel of said vehicle as it passes said wayside location.

39. The system comprising an interrogating means and a responding means, one of which is disposed on a moving vehicle and the other of which is disposed at a fixed wayside location, for communicating selected information between said vehicle and said fixed wayside location as said vehicle passes said location,
  (a) said responding means comprising,
    (1) photoelectric circuit means effective when exposed to a light beam to convert the photic energy of said light beam into a series of time spaced pulses of electrical operating energy, and
    (2) electrically operated response signal transmitting circuit means operably connected electrically to be supplied with the series of electrical operating energy pulses from said photoelectric circuit means, whereby said transmitting circuit means is rendered effective to transmit a series of time spaced response signal pulses representing a digital code of said selected information to be communicated, said response signal including directional information at certain of its time spaced code digits for distinguishing one end of said response signal from the other in accordance with the proper sequence in which said response signal is to be interpreted,
  (b) said interrogating means comprising,
    (1) a light source effective while said vehicle is passing said wayside location to direct a beam of light onto said photoelectric circuit means whereby said series of time spaced pulses of electrical operating energy is produced by said photoelectric circuit means to cause the transmission of said digitally coded response signal by said signal transmitting circuit means, and (2) means for receiving and decoding the digitally coded response signal, including shift register circuit means effective to successively store the time spaced digits in said response signal and readout circuit means operably connected to said shift register circuit means to be responsive to the directional code digits in said response signal, whereby said readout circuit means is rendered effective to selectively control the code readout sequence from said shift register circuit means in accordance with the relative direction of travel of said vehicle as it passes said wayside location.

40. In a system for communicating selected information between first and second relatively moving objects, the combination of:
 (a) a source of photic energy on said second object,
 (b) a plurality of photoelectric devices on said first object each effective when exposed to photic energy to convert such photic energy into electrical energy,
 (c) signal generating circuitry responsive to said photoelectric devices and operable to a plurality of operating conditions in accordance with which of said photoelectric devices is being exposed to said photic energy source, each operating condition producing a distinct output signal, and
 (d) photic energy directing means effective as said objects move with relation to each other to direct said photic energy selectively to predetermined ones of said plurality of photoelectric devices.

References Cited
UNITED STATES PATENTS 3,026,498  3/1962  Galliers _____ 340—34 X JOHN W. CALDWELL, *Primary Examiner.*

A. H. WARING, NEIL C. READ, *Examiners.*